United States Patent
Basini et al.

(10) Patent No.: US 9,568,251 B2
(45) Date of Patent: Feb. 14, 2017

(54) HEAT EXCHANGE SYSTEM

(75) Inventors: Luca Eugenio Basini, Milan (IT); Alfred Joachim Wilhelm, Bologna (IT)

(73) Assignee: ENI S.P.A. (IT)

(*) Notice: Subject to any disclaimer, the term of this patent is extended or adjusted under 35 U.S.C. 154(b) by 231 days.

(21) Appl. No.: 14/116,662

(22) PCT Filed: Apr. 17, 2012

(86) PCT No.: PCT/EP2012/056998
§ 371 (c)(1),
(2), (4) Date: Nov. 20, 2013

(87) PCT Pub. No.: WO2012/152548
PCT Pub. Date: Nov. 15, 2012

(65) Prior Publication Data
US 2014/0230438 A1 Aug. 21, 2014

(30) Foreign Application Priority Data
May 11, 2011 (IT) .............. MI2011A0817

(51) Int. Cl.
*F01K 23/06* (2006.01)
*F28D 15/00* (2006.01)
*C01B 3/38* (2006.01)
*C01B 3/48* (2006.01)
*F28D 21/00* (2006.01)

(52) U.S. Cl.
CPC .............. *F28D 15/00* (2013.01); *C01B 3/386* (2013.01); *C01B 3/48* (2013.01); *F28D 21/0017* (2013.01); *C01B 2203/04* (2013.01); *C01B 2203/0883* (2013.01); *C01B 2203/0894* (2013.01)

(58) Field of Classification Search
CPC ...... F28D 15/00; F28D 21/0017; C01B 3/386; C01B 3/48; C01B 2203/04; C01B 2203/0883; C01B 2203/0894
USPC ..... 60/670; 165/104.21, 141, 163, 157, 140, 165/143, 145, 160, 104.19, 159
See application file for complete search history.

(56) References Cited

U.S. PATENT DOCUMENTS

| 1,279,135 A | 9/1918 | Manville |
|---|---|---|
| 3,716,045 A | 2/1973 | Vollhardt |

(Continued)

FOREIGN PATENT DOCUMENTS

JP 2003336934 A 11/2003

*Primary Examiner* — Thomas Denion
*Assistant Examiner* — Kelsey Stanek
(74) *Attorney, Agent, or Firm* — Tarolli, Sundheim, Covell & Tummino LLP

(57) ABSTRACT

The present invention relates to a heat exchange system comprising:—a single apparatus (N) having an area immersed in a fluid bath (N2) and a free space (N1) at the head in which a vapour phase is accumulated,—at least one interspace (P) open at both ends, situated inside said apparatus and completely immersed in the fluid bath,—one or more heat exchange surface (s) (6, 7, 8, 9, 10, 11), said system characterized in that it contains all the heat exchange surfaces in a single apparatus and said surfaces are completely immersed in the fluid bath and are fluidly connected to the hot and cold sources, external to said system, through flows of matter. At least one of the heat exchange surfaces (6, 7, 8) is situated inside the interspace and at least another surface (9, 10, 11) is situated in the space between said interspace and the walls of the apparatus.

15 Claims, 1 Drawing Sheet

(56) References Cited

U.S. PATENT DOCUMENTS

| 7,607,471 B2* | 10/2009 | Saika ................. F28F 27/00 165/155 |
| 2007/0175618 A1 | 8/2007 | Key et al. |
| 2009/0194257 A1 | 8/2009 | Niu et al. |
| 2011/0137468 A1* | 6/2011 | Duncan ............. F24F 5/0035 700/277 |

* cited by examiner

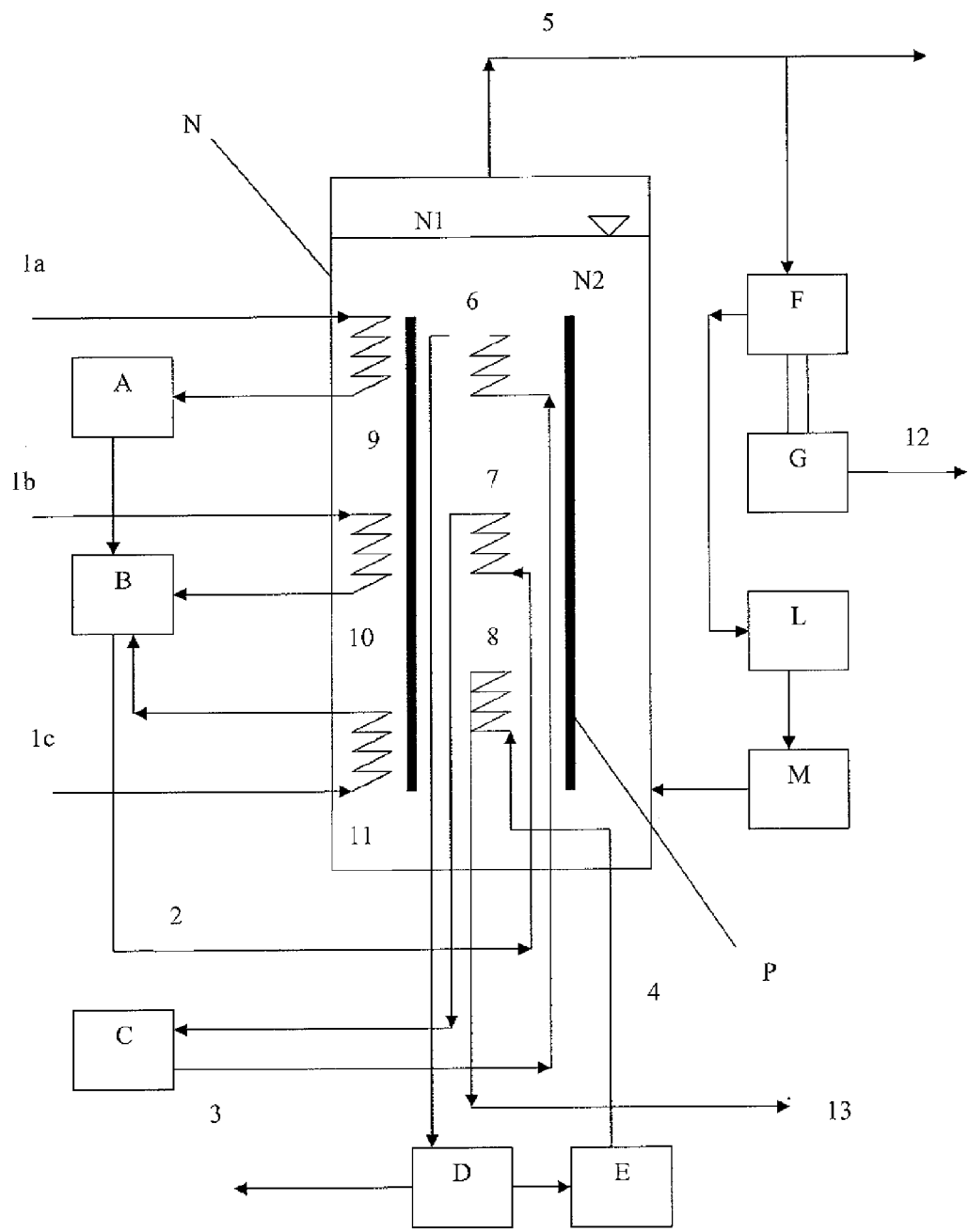

HEAT EXCHANGE SYSTEM

The present invention relates to a heat exchange system that allows the recovery of heat associated with the streams of matter circulating in a process for the production of hydrogen and/or synthesis gas. The present invention also allows the excess heat to be transformed into vapour phase, in particular steam. More specifically, the present invention allows the recovery of the heat transferred in catalytic partial oxidation processes, in particular the heat generated during the production reaction of synthesis gas and possibly during Water Gas Shift reactions.

Processes for the production of hydrogen and/or synthesis gas from hydrocarbons and organic compounds are characterized by a sequence of steps that generate heat (exothermic steps) or that absorb heat (endothermic steps). The various steps are often carried out at different temperature levels passing from room temperature of Gas Cleaning processes to 1,100° C. of Low-Contact-Time Catalytic Partial Oxidation (SCT-CPO) processes. More specifically, the temperatures oscillate from room temperature of Cleaning Gas processes to (600° C.-1000° C.) of SCT-CPO processes. Intermediate phases of the SCT-CPO process envisage further heat exchange passages with heating and cooling steps such as desulfurization (350° C.-400° C.), Water Gas Shift (280° C.-390° C.), off-gas combustion (600° C.-800° C.). In order to reach suitable temperatures for the various process steps, the different streams of matter must be heated and cooled various times, for this reason the optimization of heat exchange is a fundamental aspect and is even more so in all production processes of hydrogen and Synthesis Gas.

Heat exchange represents a critical point and plant complexity in every process, it also has a strong impact on the costs in terms, for example, of heat exchange equipment, piping, regulation valves, automation and control system.

The known technical solutions exploit for example the cooling of hot gases of a process for generating saturated vapour and/or overheated vapour using one or more heat exchange devices.

Patent U.S. Pat. No. 4,488,513 discloses an exchanger for cooling a hot gas, in particular synthesis gas coming from partial oxidation processes, thus recovering the sensitive heat and contemporaneously producing overheated vapour. The exchanger comprises two superimposed separate and distinct areas, connected to each other by means of a series of passage lines of the hot gases, appropriately jacketed. The upper part comprises a vertical, cylindrical and closed pressurized vase having an outlet in the upper part for the overheated vapour. This vase is partially filled with boiling water which forms the first cooling area of the hot gases, whereas the upper part is free and saturated with overheated vapour which forms the second cooling area. Bundles of helicoidal tubes are uniformly positioned radially around the central axis, in which one helix is ascending and one is descending. The boiling water bath fills the vase as far as the bottom of the vase and is connected with water feeding. The lower part is coated with a refractory material and is the hot gas feeding area. In this area, the hot gas is divided into a series of jacketed passage tubes connected with the helicoidal tube-bundles of the upper area. The jacket of the passage tubes has the function of preventing damage due to the high temperatures.

Patent U.S. Pat. No. 4,462,339 discloses an exchanger for the cooling of hot gases by means of water, such as those coming from partial oxidations, thus recovering the sensitive heat and contemporaneously producing saturated vapour and/or overheated vapour. The exchanger comprises two distinct and separate parts, connected to each other by means of jacketed annular passages in which water circulates. The lower part is coated with a refractory material and forms the feeding chamber of the hot gas. The upper part is a closed, vertical, cylindrical pressurized vase containing a central closed cylindrical chamber on the bottom and open at the head containing at least one bundle of helicoidal tubes, a central outlet at the head for saturated gas, various helicoidal tube bundles that extend into the annular area between the central chamber and wall of the vase. The outlet of the helicoidal tubes of the annular area is connected to the inlet of the helicoidal tubes of the central chamber. The water circulates in the annular area evaporating and producing saturated vapour. The saturated vapour can be discharged or overheated in the central chamber through a discharge outlet situated on the bottom of the chamber. The area in which water is present is the lower part of the upper vertical vase and is divided into two areas by a horizontal septum: the area between the bottom of the vase and the septum along which the jacketed passage tubes of the gas extend, and the area beneath the central chamber and above the septum in which boiling water circulates. The tubes are jacketed to prevent damages due to the high temperatures of the ingoing gases.

The Applicant has therefore found an innovative technical solution for effecting and optimizing the recovery of heat generated and transferred through streams of hot and cold matter circulating in processes for the production of hydrogen and/or synthesis gas. Said solution, object of the present invention, relates to a heat exchange system in which the various streams of matter coming from the different phases of a hydrogen and/or synthesis gas production process, with which the corresponding thermal flows are associated, exchange heat by means of a single central system which integrates the functions of preheating or heating the reagents, cooling the products and vapour generation in a single apparatus. Said system comprises one or more heat exchange surfaces completely immersed in a fluid bath, preferably water, which has both a cooling and heating function. In this way, a strong natural circulation is created in the fluid bath which allows heat exchange and balancing, transforming the excess thermal energy into vapour phase, preferably steam, said steam being collected and separated in the upper part of the apparatus included in the heat exchange system.

The objective of the present invention is to simplify the complexity of the plant solutions associated with thermal exchange phenomena, and improve the energy efficiency and safety of the hydrogen and synthesis gas production operations.

The present invention relates to a heat exchange system comprising:
  a single apparatus having an area immersed in a fluid bath and a free space at the head in which a vapour phase is accumulated,
  at least one interspace open at both ends, situated inside said apparatus and completely immersed in the fluid bath,
  one or more heat exchange surface(s),
  at least one inlet gate for one or more flows of cold matter coming from an external cold source and at least one inlet gate for one or more flows of hot matter coming from an external hot source,
  at least one outlet gate for at least a flow of cooled matter and at least one outlet for at least a flow of heated matter by means of said heat exchange surfaces,
  said system characterized in that:

said system contains all the heat exchange surfaces in a single apparatus, said heat exchange surfaces are completely immersed in the fluid bath and are fluidly connected to the hot and cold sources, external to said system, through flows of matter.

The present invention also relates to said heat exchange system in which the heat exchange surfaces are situated inside the interspace and at least another surface is situated in the space between said interspace and the walls of the apparatus. The heat exchange surfaces inside the interspace yield heat to the streams of cold matter heating them and the heat exchange surfaces situated between the interspace and the walls of the tank absorb heat from the streams of hot matter, cooling them.

The invention advantageously allows to recover the heat produced by the various exothermic steps of a hydrogen and/or synthesis gas production process. The sensitive heat is transferred by means of the fluid bath to the streams of matter involved in the endothermic process steps thus contributing to the energy optimization of the process and reducing its energy costs. In catalytic partial oxidation processes, for example, the system can advantageously recover heat from the exothermic steps typically through the reaction products and products of the Water Gas Shift reaction, and supply heat to the streams that are operating in the endothermic steps such as desulfurization. This system can advantageously contribute to cooling the streams of matter to the desired temperature.

The excess heat is advantageously transformed into vapour which can therefore be re-used for purposes within the process or for external uses. The present invention advantageously allows a reduction in the necessary encumbrances, the costs of the equipment and contributes to the possibility of engineering a system for the production of synthesis gas, cooling and vapour production.

Finally, the present invention allows the production of pre-assembled units, that can be transported and installed in sites of use with extremely reduced costs and interference risks.

Further objectives and advantages of the present invention will appear more evident from the following description and enclosed drawings, provided for purely illustrative and non-limiting purposes.

FIG. 1 illustrates a heat exchange system for the recovery of heat transferred through flows of matter applied to a catalytic partial oxidation process in which the vapour generated by the excess heat is used for the production of electric energy. In FIG. 1, the following streams and elements can be observed:

A is a desulfurization step,
B is a catalytic partial oxidation step,
C is a Water Gas Shift step,
D is a hydrogen purification and/or separation step,
E is a combustion step of the discharge gases or off-gas,
F is a steam turbine coupled with G an electric generator,
L is a condenser,
M is a reintegration pump,
N is a single heat exchange apparatus,
1a is a cold flow of reagents,
1b is a cold oxidizing flow,
1c is a cold inert flow,
2 is a hot flow of reaction products,
3 is a hot flow comprising hydrogen and carbon dioxide,
4 is a hot flow comprising combustion gas,
5 is the vapour phase generated, preferably steam,
12 is the electricity generated,
13 is a cold flow of exhausted gases.

The apparatus N comprises the interspace P, a fluid bath N2 (preferably water), and a collection space of the vapour phase generated N1 (preferably steam), one or more heat exchange surfaces 6, 7, 8, 9, 10, and 11 having a helicoidal form.

DETAILED DESCRIPTION

The heat exchange system, object of the present invention, has the purpose of recovering the sensitive heat of streams of matter associated with thermal flows coming from hot sources and/or cold sources of a process. Said streams are preferably products and/or reagents coming from the various steps of a process for the production of hydrogen and/or synthesis gas and even more preferably from the various steps of a catalytic partial oxidation process. The sensitive heat thus recovered can be used for the endothermic steps of said processes and the streams of matter can be cooled to the desired temperature by a certain process step.

The main characteristic of this system is that the heat exchange takes place in a single central system comprising a single apparatus divided into two areas:

an area immersed in a fluid bath, and a free space at the head of the bath in which a vapour phase accumulates. The fluid bath can act either as a cooling means (cooling fluid) or as a heating means (heating fluid). The fluid is preferably water and the vapour phase is preferably steam. Said heat exchange system can comprise one or more inlet gates for one or more flows of cold matter coming from an external cold source, preferably at least three inlet gates, and one or more inlet gates for one or more flows of hot matter coming from a hot source, preferably at least three.

At least one interspace, preferably cylindrical, open at both ends, is situated inside the tank, said interspace being completely immersed in the fluid bath. A characterizing element of the heat exchange system, object of the present invention, is that it contains all the exchange surfaces in a single apparatus, and that said surfaces are all completely immersed in the fluid bath, and that each surface is fluidly connected with a flow source of hot or cold matter outside the system.

Preferably one or more heat exchange surfaces can be situated inside the interspace whereas one or more heat exchange surfaces can be situated in the space between the interspace and the walls of the tank. The heat exchange surfaces situated inside the interspace preferably can release heat to the streams of cold matter, heating them, whereas the heat exchange surfaces situated between the interspace and the walls of the tank preferably can absorb heat from the streams of matter, cooling them.

There are preferably at least six heat exchange surfaces. The heat exchange surfaces may be preferably helicoidal elements in which the streams of hot or cold matter flow. The helicoidal elements may preferably be at least six.

The heat exchange system, object of the present invention, finally comprises one or more outlet gates for the streams of heated and cooled matter. Said system can also comprise at least one steam turbine coupled with at least one steam generator.

The fact that all the heat exchange surfaces are completely immersed in a fluid bath, inside the same apparatus, creates a strong natural circulation in the fluid bath which is such as to allow heat exchange and balancing and transform the excess thermal energy into vapour phase, preferably steam. The vapour phase is collected and separated in the upper part of the apparatus. During the heat transfer between the heat exchange surface and fluid bath, a biphasic area is formed inside the interspace whereas a monophase area is created outside. The density differential that can be created between the internal area of the interspace and external area can generate a strong internal circulation in the fluid bath and favour the heat exchange. The circulating fluid bath represents an excellent heat exchange fluid between the "supplier" surfaces and "consumer" surfaces of heat with an extremely high exchange coefficient.

The excess heat present in the system, object of the present invention, calculated as the difference between heat supplied and heat consumed, can be transformed into vapour and collected in the free space at the head of the apparatus, above the fluid bath. When the excess vapour phase is specifically steam, it can be used in a pre-existing vapour supply system or for the generation of electric energy by means of a steam turbine coupled with an electric generator. The steam is condensed and reintegrated into the central heat exchange system through a reintegration pump which re-injects the condensed water into the area between the pressurized tank and interspace.

The heat exchange system, object of the present invention, can be advantageously used in processes for the production of hydrogen and/or synthesis gas and preferably in catalytic partial oxidation processes, which are strongly exothermic and therefore normally produce excess heat, allowing the generation of vapour. The present invention also relates to a heat exchange and recovery process which uses the heat exchange system described and claimed in the present text, comprising the following phases:

cooling a flow of matter coming from an external hot source, in said system, by means of water, heating a flow of matter coming from an external cold source, in said system, by means of steam, transforming the excess heat present in the system into steam.

When the heat exchange and recovery process is coupled with a same catalytic partial oxidation process, the flows of heated matter enter the desulfurization and/or catalytic partial oxidation reaction steps, whereas the streams of cold matter enter a water gas shift step, a hydrogen separation and/or purification step.

Finally the steam generated during the process previously described is preferably fed to a steam supply system or used for generating electric energy.

A particular embodiment is now illustrated, which refers to FIG. 1. The heat exchange system, object of the present invention, is applied to a catalytic partial oxidation process. The streams of cold matter comprising the reagents (1a), oxidants (1b) and inert products (1c) are heated by means of the helicoidal elements 9, 10 and 11 situated in the space between the cylindrical interspace P and the tank N. The flows of hot matter coming from the reaction step B (2), the Water Gas Shift step C (3) and combustion step E (4) are cooled by means of the helicoidal elements 6, 7 and 8 situated inside the interspace P. After heating, the flows of matter circulate towards the desulfurization step A and reaction step B, whereas the flows of matter, after cooling, continue towards the Water Gas Shift step C, the hydrogen purification and/or separation step D. The exhausted gases 13 go to the torch. The vapour generated 5, enters a system consisting of a steam turbine F coupled with an electric generator G for the production of an electric current 12. The exhausted vapours are then condensed (L) and re-injected with a reintegration pump M into the heat exchange system.

With reference to a process for generating hot gases, the heat exchange system, object of the present invention, has three main functions:
1. heating the cold reagents acting as a pre-heating step,
2. cooling the hot gases produced, acting as a cooling exchanger, in particular in the case of synthesis gas,
3. sending the excess vapour produced in the feeding to a steam supply system or transforming it into electric energy.

In this way, the energy efficiency of processes which generate hot gases, such as those for producing synthesis gas and hydrogen, is increased. The invention also allows a reduction in the encumbrances necessary for heat exchange operations as it can effect the whole heat transfer process in a single apparatus. Furthermore, it contributes to projecting a system for the production of synthesis gas, cooling and vapour production in extremely limited volumes so as to allow the production of pre-assembled units, which can be transported and installed in the sites of use with considerably reduced costs and interference risks.

The invention claimed is:

1. A heat exchange system comprising:
   a single apparatus having an area immersed in a fluid bath and a free space at the apparatus head in which a vapour phase is accumulated,
   at least one interspace open at both ends, situated inside said apparatus and completely immersed in the fluid bath,
   one or more heat exchange surface(s) which yield heat to one or more flows of cold material,
   one or more heat exchange surface(s) which absorb heat from one or more flows of hot material,
   at least an inlet gate for the one or more flows of cold material coming from an external cold source and at least an inlet gate for the one or more flows of hot material coming from an external hot source,
   at least an outlet gate for at least a flow of cooled material and at least an outlet gate for at least a flow of heated material by means of said heat exchange surfaces,
   wherein:
   said system contains all the heat exchange surfaces in the single apparatus,
   said heat exchange surfaces are completely immersed in the fluid bath and are fluidly connected to the hot and cold sources, external to said system, through flows of material,
   the heat exchange surface(s) which yield heat to the one or more flows of cold material are situated inside the interspace and the heat exchange surface(s) which absorb heat from the one or more flows of hot material are situated in the space between said interspace and the walls of the apparatus, and
   the external hot sources and the cold sources are hot material and cold material generated in the production process of hydrogen or synthesis gas, or both.

2. The heat exchange system according to claim 1, which also comprises at least one steam turbine coupled with at least one electric generator.

3. The heat exchange system according to claim 1, wherein the heat exchange surfaces are in the form of helicoidal elements in which the streams of material flow.

4. The heat exchange system according to claim 3, wherein there are at least six helicoidal elements.

5. The heat exchange system according to claim 1, wherein the interspace is cylindrically shaped.

6. The heat exchange system according to claim 1, wherein the fluid is water and the vapour phase is steam.

7. The heat exchange system according to claim 1, wherein there are at least three inlet gates for the flow of cold material, and at least three inlet gates for the flow of hot material.

8. The heat exchange system according to claim 1, wherein there are at least six heat exchange surfaces.

9. The heat exchange system according to claim 1, wherein the flows of cold material are at least one of reagents, oxidants or inert products coming from a catalytic partial oxidation process.

10. The heat exchange system according to claim 1, wherein the flows of hot material are products coming from at least one of a catalytic partial oxidation reaction step, a Water Gas Shift step or a combustion step of a catalytic partial oxidation process.

11. A heat exchange and recovery process that uses the heat exchange system according to claim 1, comprising the following phases:
   cooling a flow of material coming from the external hot source, in said heat exchange system, by means of water,
   heating a flow of material coming from the external cold source, in said heat exchange system, by means of steam, and
   transforming the excess heat present in said heat exchange system into steam.

12. The heat exchange and recovery process according to claim 11, wherein the heat exchange surfaces inside the interspace, included in the heat exchange system, transfer heat to the flows of cold material, heating them, and the heat exchange surfaces between the interspace and walls of the apparatus absorb heat from the flows of hot material, cooling them.

13. The heat exchange and recovery process according to claim 12, wherein the steam generated is fed to a steam supply system or used for generating electric energy.

14. The heat exchange and recovery process according to claim 12, wherein the flows of heated material enter a desulfuration or catalytic partial oxidation reaction steps of a catalytic partial oxidation process, or both.

15. The heat exchange and recovery process according to claim 12, wherein the flows of cooled material enter at least one of a water gas shift step, a hydrogen separation or purification step of a catalytic partial oxidation process.

* * * * *